United States Patent
Li et al.

(10) Patent No.: US 10,406,643 B2
(45) Date of Patent: Sep. 10, 2019

(54) MACHINING THERMOSTATIC CONTROL SYSTEM AND METHOD OF USING THE SAME

(71) Applicant: Industrial Technology Research Institute, Hsin-Chu (TW)

(72) Inventors: Kun-Ying Li, Changhua County (TW);
Kuan-Wen Chen, Taichung (TW);
Hsi-Hung Hsiao, Taichung (TW);
Yung-Chao Chan, Taichung (TW);
Shi-Jie Luo, Changhua County (TW);
Yu-Shiang Huang, Taichung (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 389 days.

(21) Appl. No.: 15/349,239

(22) Filed: Nov. 11, 2016

(65) Prior Publication Data
US 2018/0071877 A1 Mar. 15, 2018

(30) Foreign Application Priority Data
Sep. 13, 2016 (TW) .............................. 105129861 A (51) Int. Cl.
B23Q 11/14 (2006.01)
B23Q 11/10 (2006.01)
B23Q 17/20 (2006.01)

(52) U.S. Cl.
CPC ............ B23Q 11/141 (2013.01); B23Q 11/10 (2013.01); B23Q 11/1076 (2013.01); B23Q 17/20 (2013.01)

(58) Field of Classification Search
CPC .. B23Q 17/20; B23Q 11/1076; B23Q 11/141; B23Q 11/10
See application file for complete search history.

(56) References Cited

U.S. PATENT DOCUMENTS 3,577,808 A * 5/1971 Visser .................... B23P 25/00
408/61
4,680,897 A * 7/1987 Daniels ................. B23B 35/00
408/1 R
(Continued)

FOREIGN PATENT DOCUMENTS

CA 2766130 A1 * 7/2010 ............. B08B 15/04
CN 2574830 Y 9/2003
(Continued)

OTHER PUBLICATIONS

Ou, Feng-Ming, A+ Machine tool thermal balance technology improvement and application research, Journal of the Mechatronic Industry., Mar. 2009, p. 68, Taiwan.
(Continued)

Primary Examiner — Kun Kai Ma
(74) Attorney, Agent, or Firm — WPAT, PC (57) ABSTRACT

A machining thermostatic control system and method of using the same are disclosed. The system comprises a detecting unit, a processing unit and at least a cooling unit. The detecting unit is used for detecting the temperature distribution of a workpiece. The processing unit is coupled to the detecting unit and is used for processing the temperature distribution for obtaining a position of maximum hot spot of the workpiece. The cooling unit comprises a head which is provided for discharging cooling fluid and a plurality of blades which are angle-adjustably mounted to the head. The blades are coupled to the processing unit and the angle of blades are controlled by the processing unit for enabling the cooling fluid to flow toward to the position of maximum hot spot position.

16 Claims, 6 Drawing Sheets

(56) References Cited

U.S. PATENT DOCUMENTS

| | | | | | |
|---|---|---|---|---|---|
| 4,888,200 | A | * | 12/1989 | Milliken | B05D 1/04 427/478 |
| 5,513,802 | A | * | 5/1996 | Ueki | B05B 15/654 239/571 |
| 5,993,121 | A | * | 11/1999 | Fiesta | B23Q 11/1076 408/56 |
| 6,123,270 | A | * | 9/2000 | Hara | B05B 7/02 239/422 |
| 6,409,641 | B1 | * | 6/2002 | Hashimoto | B23Q 3/1552 408/56 |
| 6,569,003 | B1 | * | 5/2003 | Harlan | B23D 59/04 451/184 |
| 10,112,202 | B1 | * | 10/2018 | Dichter | B23C 3/00 |
| 10,183,369 | B2 | * | 1/2019 | Kurokawa | B23Q 11/1076 |
| 10,307,876 | B2 | * | 6/2019 | Okuda | B08B 9/00 |
| 2002/0174861 | A1 | * | 11/2002 | Lundt | B28D 5/0064 125/21 |
| 2006/0228465 | A1 | * | 10/2006 | Zurecki | C21D 1/613 427/8 |
| 2010/0150674 | A1 | * | 6/2010 | Gao | B23Q 11/10 408/61 |
| 2012/0167733 | A1 | * | 7/2012 | Lee | B28D 5/0076 83/169 |
| 2013/0203320 | A1 | * | 8/2013 | Ghalambor | B24C 1/083 451/2 |
| 2014/0044148 | A1 | * | 2/2014 | Katsumata | G01J 5/0044 374/121 |
| 2015/0290758 | A1 | | 10/2015 | Liang | |
| 2016/0089808 | A1 | * | 3/2016 | Watanabe | B26F 3/004 83/177 |
| 2017/0297158 | A1 | * | 10/2017 | Nerling | B23Q 11/10 |
| 2018/0015582 | A1 | * | 1/2018 | Mohr | B23Q 11/10 |

FOREIGN PATENT DOCUMENTS

| | | |
|---|---|---|
| CN | 2903888 Y | 5/2007 |
| CN | 101249615 A | 8/2008 |
| CN | 102501173 A | 6/2012 |
| CN | 105729237 A | 7/2016 |
| JP | 57-103728 A | 6/1982 |
| JP | 11-320326 A | 11/1999 |
| KR | 10-2008-0054243 | 6/2008 |
| TW | 201016379 | 5/2010 |
| TW | I340058 | 4/2011 |
| TW | I431225 | 3/2014 |
| TW | 201429605 A | 8/2014 |
| TW | I504473 | 10/2015 |

OTHER PUBLICATIONS

Hiwin Technologies Corp., Cool Type ball screw, Ballscrew Category, 2014, p. 180-183, Taiwan.

Makino, Precision Micromachining Center, Makino Category, 2012, p. 5-6 Japan.

Yasda Precision Tools, Yasda Micro Center YMC430, Yasda Category, Jan. 2009, p. 4-5, Japan.

PMI Group. , Hollow ball screw designed by PMI, http://www.pmi-amt.com/tw/products/pmi_10.html, 2009, Taiwan.

Su, Chun-Hsiung, Observation of how Japan's major companies depress thermal expansion of main shaft and structure, Machine Tool & Accessory Magazine, Dec. 2008, p. 29-35, Taiwan.

Habor Precise Inc., Water-cooled heat exchanger, Electronic Catalog, 2015, Taiwan.

Shen, Jian-Hua et al., Observe the development trend of key machine tool system of Japan from JIMTOF 2014, Taiwan Machinery Monthly Report, Feb. 2014, p. 40-45.

Ace Pillar Co ., Ltd., High-class 5-axis machine tool hydraulic pressure and cooling energy-saving system seminar, Oct. 14, 2014, Taiwan.

Taiwan patent office "Office Action" dated Jun. 6, 2017, Taiwan.

CN OA issued on Jan. 22, 2019.

* cited by examiner

MACHINING THERMOSTATIC CONTROL SYSTEM AND METHOD OF USING THE SAME

CROSS REFERENCE TO RELATED APPLICATION

This application also claims priority to Taiwan Patent Application No. 105129861 filed in the Taiwan Patent Office on Sep. 13, 2016, the entire content of which is incorporated herein by reference.

TECHNICAL FIELD

The present disclosure relates to a machining thermostatic control system and a method of using the same, and more particularly, to a machining thermostatic control system capable of reducing thermal error by using a temperature signal that is obtained from a means of temperature calculation to adjust outlet direction, flow and temperature of a cooling fluid for enabling a heat exchanging operation to happen at a position of maximum hot spot of a workpiece that is being machined at a high speed.

BACKGROUND

Generally, the precision of a machining tool can be affected by factors including: the static geometry errors and the dynamic thermal error of the tool itself, the wear-and-tear of a cutting tool while being used in a machining operation, and the thermal deformation happened on a workpiece that is being machined. According to prior studies, thermal deformation is responsible for about 40% to 70% of machining errors of a machining tool, so that the thermal behavior of a machine tool can be used as a performance index for measuring the precision and stability of the machine tool. That is, if the thermal behavior is repetitive and stable, the machine tool is able to maintain a good machining quality for a sustainable long period of time; otherwise if the thermal behavior is varying significantly, there may be thermal induced deformation on the structure of the machine tool, that can further cause displacement or deform to a cutting end of the machine tool, and consequently the machining quality of a workpiece that is being machined by the deformed cutting tool can be seriously affected as the required geometry accuracy and surface texture on the workpiece can not be met.

It is noted that for reducing the adverse affect of thermal deformation, cooling fluid, such as a cooling oil, is commonly being used for enabling heat exchanging between a cutting tool and a workpiece being machined. Operationally, the cooling fluid is pumped to a chiller where it is chilled down before being guided to flow through a structure for cooling, and then the cooling fluid is drown to flow back to an oil tank to complete a cooling cycle. However, despite the heat exchanging enabled by the use of a cooling fluid is easy to operate and apply, it is difficult to control the heat exchanging to be happened at a specified position and thus the cooling position could only be adjusted according to user experience. Consequently, the efficiency of heat exchanging between a cutting tool and a workpiece is poor, and there can be thermal deformation being induced to a structure that is being cooled by the varying cooling fluid as the temperature change of the structure is not stable. Not to mention that it is difficult to pin point a position of maximum hot spot on a workpiece for heat dissipation; the flowing of the cooling fluid on the portion of the workpiece that is not being machined could cause shrinkage to the portion of the workpiece; the temperature raising to the cooling fluid after heat exchanging can cause temperature difference to the structure which can induce certain thermal error; and the machining operation using cooling fluid could be very costly as the cooling fluid is generally limited to a specified lifespan and required to be changed regularly.

In addition, currently there are infrared thermometers being used for sensing temperature of an object, whereas the infrared thermometers could convert the radiant infrared energy emitted from the object's surface to an electrical signal that can be displayed in units of temperature after being compensated for ambient temperature. However, the operation of such infrared thermometers rely heavily on the use of proper temperature calculation unit for ambient temperature compensation, otherwise reading of the infrared thermometers may be subject to error due to the reflection of radiation from ambient environment. Moreover, the infrared thermometers that are current available on the market can only display temperature without the ability to enable a certain posterior processes according to the temperature detection.

Therefore, the focus point of the present disclosure is to develop a machining thermostatic control system and a method of using the same, and more particularly, to a machining thermostatic control system capable of reducing thermal error by using a temperature signal that is obtained from a means of temperature calculation to adjust outlet direction, flow and temperature of a cooling fluid for enabling a heat exchanging operation to happen at a position of maximum hot spot of a workpiece that is being machined at a high speed.

SUMMARY

In an embodiment, the present disclosure provides a machining thermostatic control system, which comprises: a detecting unit, for detecting the temperature distribution of a workpiece; a processing unit, coupled to the detecting unit for processing the temperature distribution so as to obtain a position of maximum hot spot of the workpiece; and at least a cooling unit, further comprising: a head, provided for discharging a cooling fluid; and a plurality of blades, angle-adjustably mounted to the head; wherein, the blades are coupled to the processing unit for allowing the angle of blades to be controlled by the processing unit and thus enabling the cooling fluid to flow toward to the position of maximum hot spot position.

In another embodiment, the present disclosure provides a machining thermostatic control method, which comprises the steps of:

using a detecting unit to detect the temperature distribution of a workpiece;

using a processing unit to process the temperature distribution so as to obtain a position of maximum hot spot of the workpiece; and using the processing unit to adjust blade angle of at least one cooling unit for enabling a cooling fluid to flow toward to the position of maximum hot spot position.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
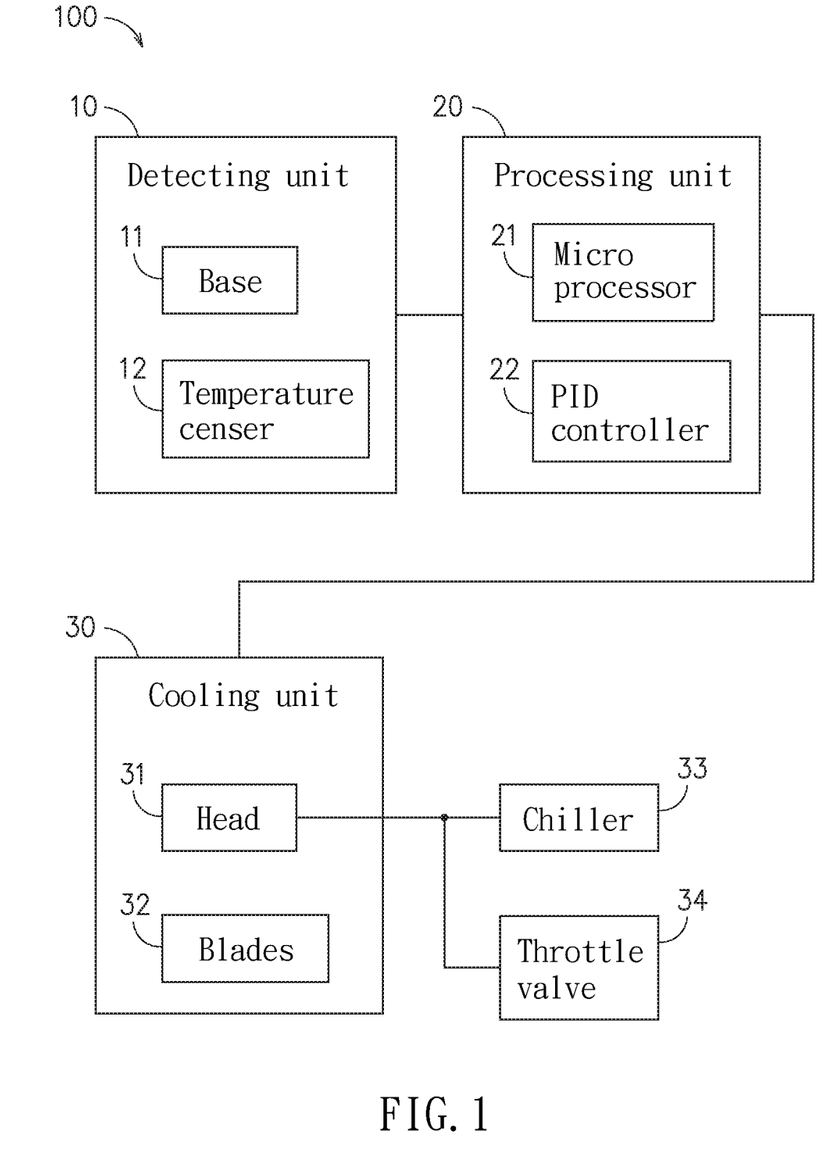
FIG. 1 is a schematic diagram showing a machining thermostatic control system of the present disclosure.
Figure 2:
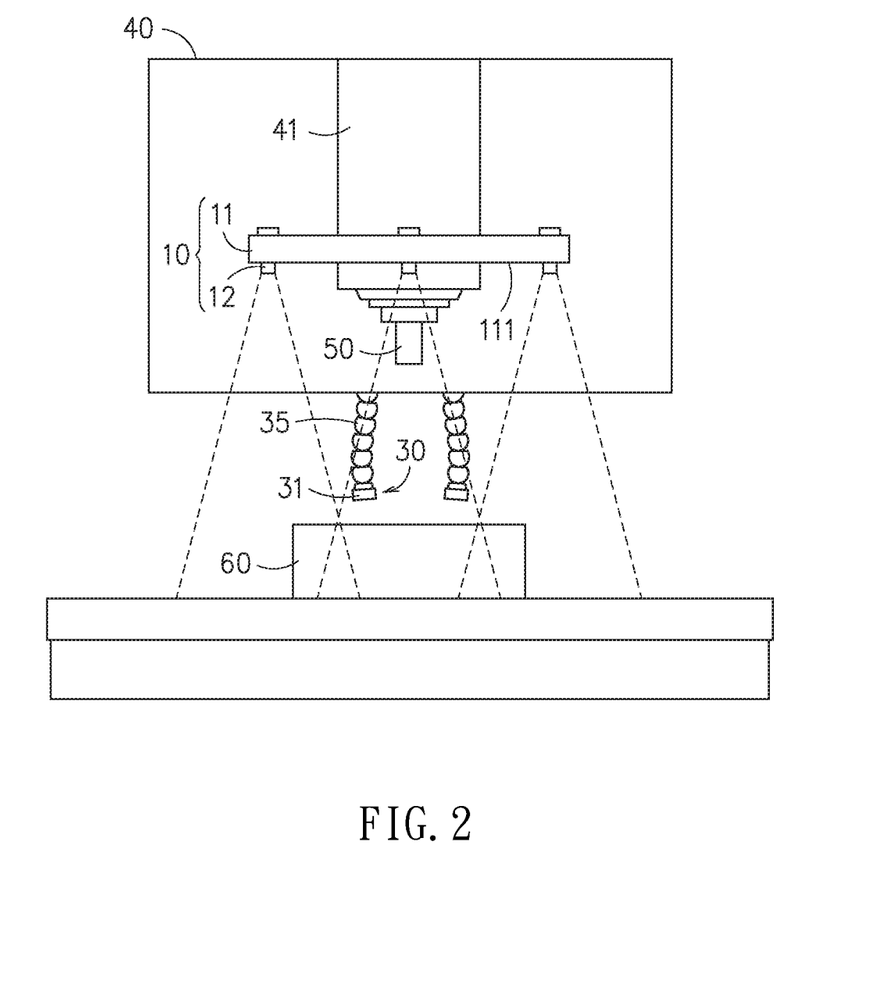
FIG. 2 is a schematic diagram showing a portion of the machining thermostatic control system of the present disclosure

As shown in FIG. 1 and FIG. 2, a machining thermostatic control system 100 is disclosed, which comprises a detecting unit 10, a processing unit 20 and at least one cooling unit 30. In this embodiment, when a machine tool 40 is operating using a cutting tool 50 to machine a workpiece 60, the machining thermostatic control system 100 is enabled to detect a temperature distribution of the workpiece 60 that is being machined while enabling a cooling process to be performed on a high-temperature area of the workpiece for thermostatic control.

As shown in FIG. 2, the detecting unit 10 further comprises a base 11 and a plurality of temperature sensors. The base 11 is formed with a first surface 111 that is arranged facing toward the workpiece 60; and the plural temperature sensors are disposed on the first surface 111. It is noted that the base 11 can be formed in any shape and size; and also there is no restriction relating to the amount of temperature sensors 12 and the location thereof as well. For instance, the base 11 can be a plate of a circular shape, a rectangular shape or any irregular shape conforming to the cutting area requirement and the size of the workpiece; and similarly the temperature sensors 12 can be radially arranged, linear arranged or arranged into an array on the first surface 111 of the base 11. It is noted that each of the plural temperature sensors 12 is a device selected from the group consisting of: an infrared sensor, an infrared scope, and the combination thereof; and the temperature sensors 12 should be arranged for allowing a total sensing area to cover the whole workpiece 60. In an embodiment, the detecting unit 10 is mounted on a spindle head 41 of the machine tool 40 while being enabled to detect the temperature distribution of the workpiece 60, and thereby the detecting unit 10 is able to move with the spindle head 41 following the movement of the spindle head 41 for detecting the machining temperature of the workpiece 60. In another embodiment, the detecting unit 10 is fixedly disposed at a specific position relative to the machine tool 40 and is not moved with the movement of the machine tool 40, but it is important to ensure that the whole machine area of the workpiece 60 can be detected by the detecting unit 10.

In FIG. 1, the processing unit 20 is coupled to the detecting unit 10, whereas the processing unit 20 is composed of a micro processor 21 and a proportional-integral-derivative (PID) controller 22. In this embodiment, the micro processor 21 is used for processing the temperature distribution of the detecting unit 10 and thus obtaining the position of maximum hot spot position of the workpiece 60 so as to outputt a temperature signal accordingly; and the PID controller 22 is used for controlling the cooling unit 30 according to the temperature signal.

Figure 3:
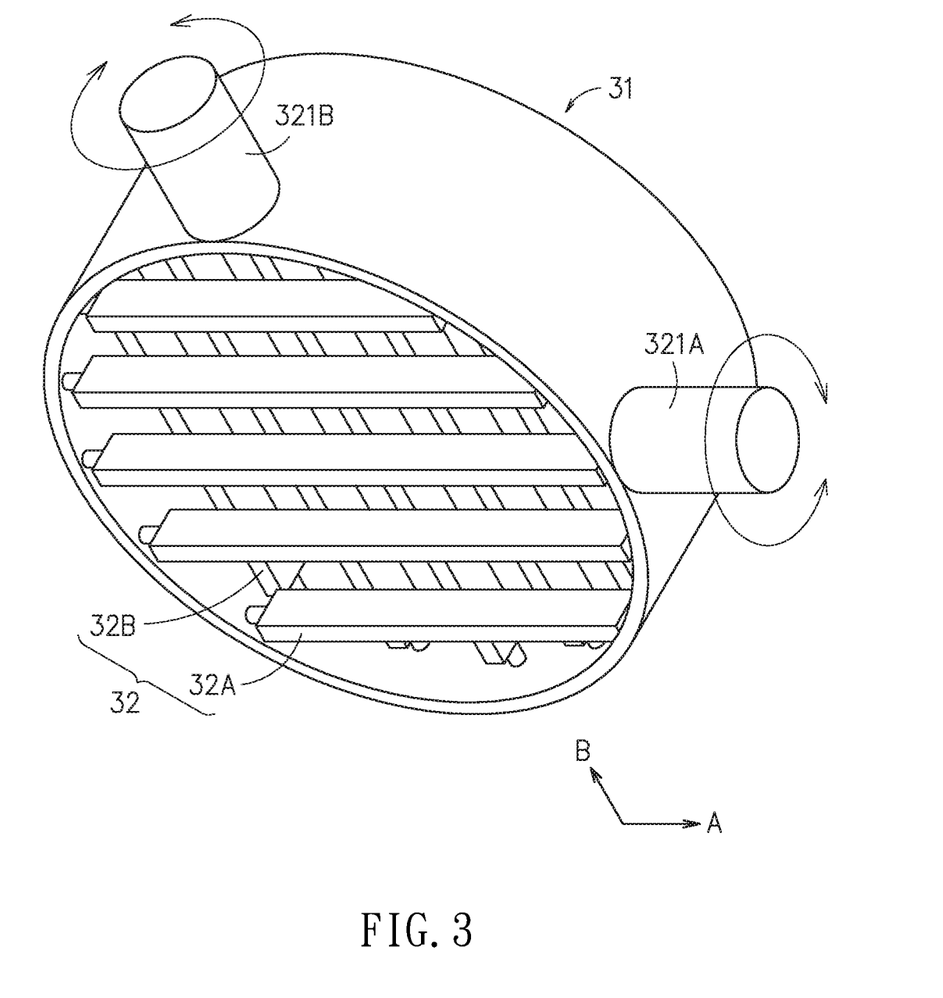
FIG. 3 is a schematic diagram showing a cooling unit that is used in a machining thermostatic control system of the present disclosure.

As shown in FIG. 1 to FIG. 3, the cooling unit 30 includes a head 31 and a plurality of blades 32 in a manner that the head 31 is coupled to a chiller 33 and the throttle valve 34. In this embodiment, the cooling fluid is disposed inside the chiller 33 while allowing the cooling fluid to be discharged out from the head 31; and the throttle valve 34 is provided for controlling and adjusting the flow of the cooling fluid that is being discharged from the head 31. In FIG. 2, the head 31 is connected to a directional tube 35, via that the head 31 is further connected to the chiller 33 and the throttle valve 34.

The plural blades 32 is further composed of a plurality of first blades 32A and a plurality of second blades 32B in a manner that each of the plural first blades is formed with a first extension direction A while enabling the plural first blades 32A to be arranged parallel with one another along the first extension direction A; and each of the plural second blades 32B is formed with a second extension direction B that is arranged perpendicular to the first extension direction A, while enabling the plural first blades to be arranged parallel with one another along the second extension direction B. In an embodiment, the plural first blades 32A are coupled to a first motor 321A; the plural second blades 32B are coupled to a second motor 321B; and the first motor 321A and the second motor 321B are further coupled to the processing unit 20 for allowing the processing unit 20 to control the first motor 312A and the second motor 321B respectively and thus bring along the plural first blades 32A and the plural second blades 32B to move accordingly.

Figure 4:
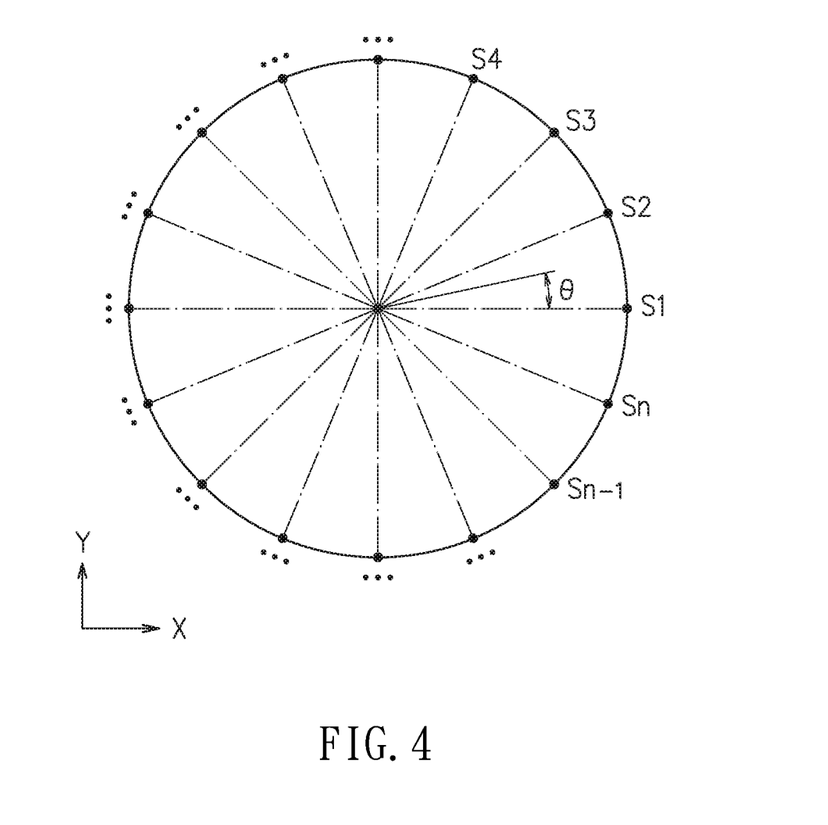
FIG. 4 is a schematic diagram showing the arrangement of temperature sensors in a machining thermostatic control system of the present disclosure.

Please refer to FIG. 4, which is a schematic diagram showing the arrangement of temperature sensors in a machining thermostatic control system of the present disclosure. In this embodiment, a machining thermostatic control method is provided, using which the detection of the plural temperature sensors can be used for obtaining temperature angles and direction in a high-temperature area of interested. In FIG. 4, there are n temperature sensors S1~Sn that area radially and equiangularly disposed on a reference plane, and a calculation method is provided for obtaining the position of highest temperature and the position of lowest temperature and the related detections.

The temperatures detected respectively by the temperature sensors S1~Sn are $T_1 \cdot T_2 \cdot T_3 \cdot T_4 \cdot T_5 \cdot T_6 \cdot \ldots \cdot T_{n-1} \cdot T_n$, and the angularly difference between any two temperature sensors can be presents as 360°/n as the temperature sensors S1~Sn are radially and equiangularly disposed on the reference plane. Accordingly, the temperature calculation method is performed using the following equations:

$$O_x = \sum_{i=1}^{n} T_i \cos\left(\frac{360°}{n}\right) = T_1\cos\theta + T_2\cos\theta + T_3\cos\theta + \ldots + T_{n-1}\cos\theta + T_n\cos\theta$$

$$O_y = \sum_{i=1}^{n} T_i \sin\left(\frac{360°}{n}\right) = T_1\sin\theta + T_2\sin\theta + T_3\sin\theta + \ldots + T_{n-1}\sin\theta + T_n\sin\theta$$

$$\tan\theta = \frac{O_y}{O_x}, \theta = \tan^{-1}\left(\frac{O_y}{O_x}\right);$$

and the so-obtained hot area temperature is: $T_o = T_i - V_x$.

A numerical method is then used for calculating and obtaining the value of $V_x$ and $V_y$, so as to be used for calculating θ and temperature for positioning temperature vectors relating to a high temperature position, a low temperature position, or a position of a specific temperature. Thereafter, the orientations relating to a max temperature and a min temperature can be determined, whereas the orientation of the min temperature is opposite to that of the max temperature, and thereby the angle of the maximum temperature can be obtained.

Figure 5:
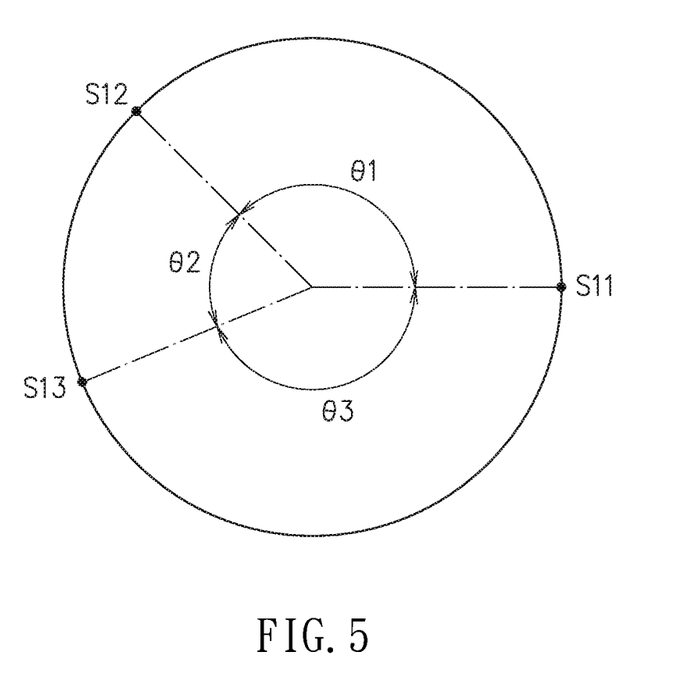
FIG. 5 is a schematic diagram showing three temperature sensors that are being arranged in a machining thermostatic control system of the present disclosure.

The parameters used in FIG. 4 are defined as following:
$O_x$ represents size in X direction;
$O_y$ represents size in Y direction;
$T_o$ represents temperature measured at the center of a high-temperature area;
$V_x$ represents X included-angle component relating to maximum temperature;
$V_y$ represents Y included-angle component relating to maximum temperature;
$T_i$ represents temperatures measured at various positions within the high-temperature area;

Please refer to FIG. 5, which is a schematic diagram showing three temperature sensors that are being arranged in a machining thermostatic control system of the present disclosure. In FIG. 5, there are three temperature sensors S11, S12, S13 that are being used for measuring temperatures of a machining workpiece, whereas the temperatures obtained respectively from the three temperature sensors S11, S12 and S13 are represented as $T_1$, $T_2$, and $T_3$ that are to be used in a temperature calculation operation. In FIG. 5, the three temperature sensors S11, S12, S13 are randomly arranged with respect to the angles $\theta_1$, $\theta_2$, and $\theta_3$, the temperature calculation of n=3 is performed according to the following equations:

$$O_x = \sum_{i=1}^{n} T_i \cos\theta_i = T_1\cos\theta_1 + T_2\cos\theta_2 + T_3\cos\theta_3$$

$$O_y = \sum_{i=1}^{n} T_i \sin\theta_i = T_1\sin\theta_1 + T_2\sin\theta_2 + T_3\sin\theta_3$$

$$\theta = \tan^{-1}\left(\frac{O_y}{O_x}\right)$$

$$T_o = T_i - V_x$$

when $\theta_{max} \leq 180°$, $\theta_{Min} = \theta_{Max} + 180°$
when $\theta_{max} > 180°$, $\theta_{Min} = \theta_{Max} - 180°$ From the above equations, a position of maximum hot spot can be obtained. In an embodiment, in a condition when the flowing of the cooling fluid can cover a specific position with +/−3 cm tolerance, a satisfactory cooling effect can be achieve if the error of tolerance for the calculation relating to the position of maximum hot spot is kept under +/−3 cm.

In FIG. 1 to FIG. 3, the micro processor 21 of the processing unit 20 is used for processing the temperature distribution from the detecting unit 10, so as to obtain the position of maximum hot spot position of the workpiece 60 and output a temperature signal accordingly, and then the PID controller 22 can be enabled to control respectively the first motor 321A and the second motor 321B of the cooling unit 30 to adjust the swing angles of the first blades 32A and the second blades 32B for enabling the cooling fluid to flow toward the position of maximum hot spot. In addition, as the head 31 is connected to the chiller 33 and the throttle valve 34, the processing unit can also be enabled to control the chiller 33 to adjust the temperature of the cooling fluid, or to control the voltage of the throttle valve 34 to adjust the flow of the cooling fluid, according to the temperature of the position of maximum hot spot.

Figure 6:
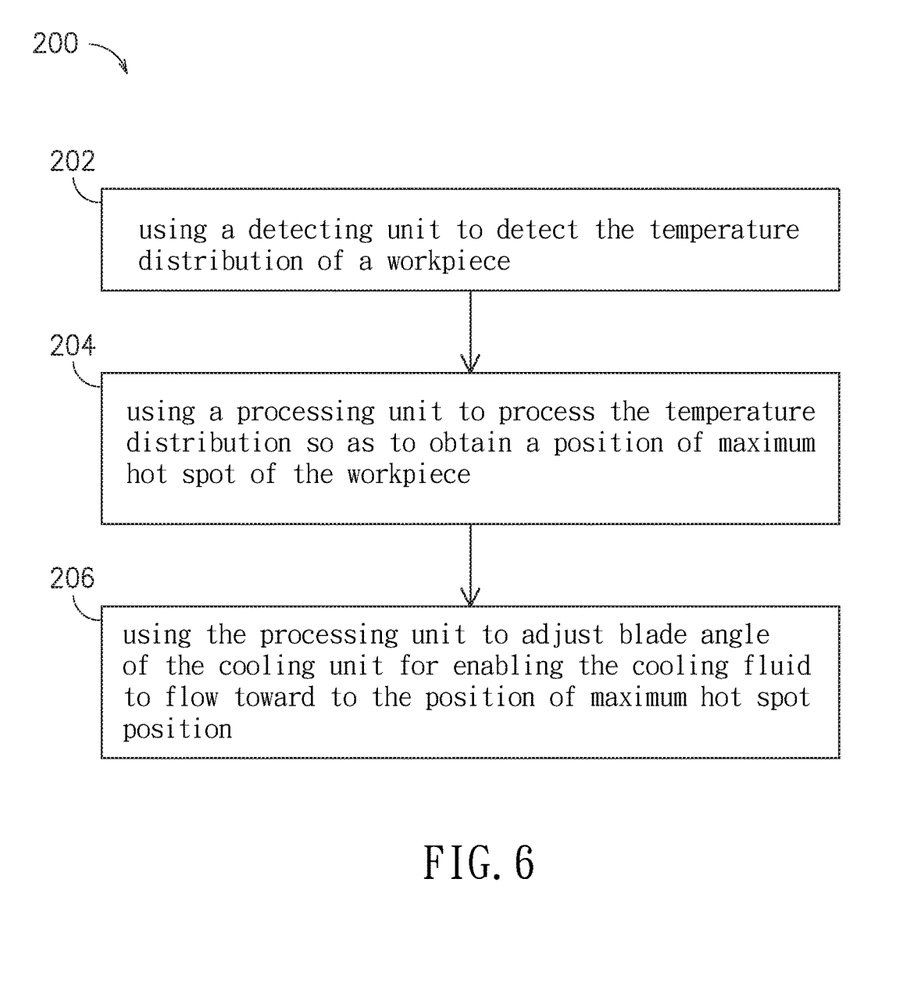
FIG. 6 is a flow chart depicting the steps performed in a machining thermostatic control method of the present disclosure.

Please refer to FIG. 6, which is a flow chart depicting the steps performed in a machining thermostatic control method of the present disclosure. In FIG. 6, a method using the machining thermostatic control system 100 is disclosed, which comprises the following steps:

step 202: using a detecting unit 10 to detect the temperature distribution of a workpiece 60;
step 204: using a processing unit 20 to process the temperature distribution so as to obtain a position of maximum hot spot of the workpiece 60; and
step 206: using the processing unit 20 to adjust blade angle 32 of the cooling unit 30 for enabling the cooling fluid to flow toward to the position of maximum hot spot position.

To sum up, the focus point of the present disclosure is to develop a machining thermostatic control system and a method of using the same, and more particularly, to a machining thermostatic control system capable of reducing thermal error by using a temperature signal that is obtained from a means of temperature calculation to adjust outlet direction, flow and temperature of a cooling fluid for enabling a heat exchanging operation to happen at a position of maximum hot spot of a workpiece that is being machined at a high speed. Consequently, the high-temperature of the machining workpiece can be detected effectively, temperature raising of the machining workpiece can be reduced effectively, thermal error can be decreased, the effectiveness of the flowing cooling fluid is improved and the structure deformation caused by temperature variation is minimized.

It is noted that all the infrared thermometers that are currently available on the market can only detect and display temperatures and are not designed to perform any posterior processes using the detected temperature values. In another word, the detecting unit in the present disclosure is not simply a device for detecting and displaying temperature, but is a device composed of a plurality of sensors that are coupled to the processing unit, by that the processing unit is able perform an calculation/analysis to obtain a position of maximum hot spot so as to use the temperature of the position of maximum hot spot to adjust the orientation of the cooling unit and the flow and temperature of the cooling fluid.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A machining thermostatic control system, comprising:
   a detecting unit, for detecting the temperature distribution of a workpiece;
   a processing unit, coupled to the detecting unit for processing the temperature distribution so as to obtain a position of maximum hot spot of the workpiece; and
   at least a cooling unit, further comprising: a head, provided for discharging a cooling fluid; and
   a plurality of blades, angle-adjustably mounted to the head;
   wherein, the plurality of blades are coupled to the processing unit for allowing an angle of the plurality of blades to be controlled by the processing unit and thus enabling the cooling fluid to flow toward to the position of maximum hot spot position.

2. The system of claim 1, wherein the detecting unit further comprises:
   a base, formed with a first surface facing toward the workpiece; and
   a plurality of temperature sensors, radially arranged on the first surface and used for detecting the temperature distribution of the workpiece.

3. The system of claim 2, wherein each of the plural temperature sensors is a device selected from the group consisting of: an infrared sensor, an infrared scope, and the combination of thereof.

4. The system of claim 1, wherein the plurality of blades further comprises:
   a plurality of first blades, each being arranged coupling to the processing unit, and each being formed with a first extension direction while enabling the plural first blades to be arranged parallel with one another along the first extension direction and being driven to move by the processing unit; and
   a plurality of second blades, each being arranged coupling to the processing unit, and each being formed with a second extension direction that is arranged perpendicular to the first extension direction, while enabling the plural first blades to be arranged parallel with one another along the second extension direction and being driven to move by the processing unit.

5. The system of claim 4, wherein the plurality of first blades are coupled to a first motor; the plurality of second blades are coupled to a second motor; and the first motor and the second motor are further coupled to the processing unit for allowing the processing unit to control the first motor and the second motor respectively and thus bring along the plurality of first blades and the plurality of second blades to move accordingly.

6. The system of claim 1, wherein the head is further coupled to a chiller, and the cooling fluid is disposed inside the chiller; the processing unit is enabled to control the chiller to adjust the temperature of the cooling fluid according to the temperature of the position of maximum hot spot position.

7. The system of claim 1, wherein the head is further coupled to a throttle valve, and the processing unit is enabled to control the voltage of the throttle valve to adjust the flow of the cooling fluid according to the temperature of the position of maximum hot spot position.

8. The system of claim 1, wherein the processing unit further comprises:
   a micro processor, for obtaining the position of maximum hot spot position and outputting a temperature signal accordingly; and
   a proportional-integral-derivative (PID) controller, for controlling the angles of the plurality of blades according to the temperature signal.

9. A machining thermostatic control method, comprising the steps of:
   using a detecting unit to detect the temperature distribution of a workpiece;
   using a processing unit to process the temperature distribution so as to obtain a position of maximum hot spot of the workpiece; and
   using the processing unit to adjust blade angle of at least one cooling unit for enabling a cooling fluid to flow toward to the position of maximum hot spot position;
   wherein the cooling unit further comprises a head that is provided for a plurality of blades to be disposed therein.

10. The method of claim 9, wherein the detecting unit further comprises:
    a base, formed with a first surface facing toward the workpiece; and
    a plurality of temperature sensors, radially arranged on the first surface and used for detecting the temperature distribution of the workpiece.

11. The method of claim 10, wherein each of the plural temperature sensors is a device selected from the group consisting of: an infrared sensor, an infrared scope, and the combination of thereof.

12. The method of claim 9, wherein the plurality of blades comprises:
    a plurality of first blades, each being arranged coupling to the processing unit, and each being formed with a first extension direction while enabling the plural first blades to be arranged parallel with one another along the first extension direction and being driven to move by the processing unit; and
    a plurality of second blades, each being arranged coupling to the processing unit, and each being formed with a second extension direction that is arranged perpendicular to the first extension direction, while enabling the plural first blades to be arranged parallel with one another along the second extension direction and being driven to move by the processing unit.

13. The method of claim 12, wherein the plurality of first blades are coupled to a first motor; the plurality of second blades are coupled to a second motor; and the first motor and the second motor are further coupled to the processing unit for allowing the processing unit to control the first motor and the second motor respectively and thus bring along the plurality of first blades and the plurality of second blades to move accordingly.

14. The method of claim 9, wherein the head is further coupled to a chiller, and the cooling fluid is disposed inside the chiller; the processing unit is enabled to control the chiller to adjust the temperature of the cooling fluid according to the temperature of the position of maximum hot spot position.

15. The method of claim 9, wherein the head is further coupled to a throttle valve, and the processing unit is enabled to control the voltage of the throttle valve to adjust the flow of the cooling fluid according to the temperature of the position of maximum hot spot position.

16. The method of claim 9, wherein the processing unit further comprises:

a micro processor, for obtaining the position of maximum hot spot position and outputting a temperature signal accordingly; and
a proportional-integral-derivative (PID) controller, for controlling the angles of the plurality of blades according to the temperature signal.

* * * * *